(12) United States Patent
Crain et al.

(10) Patent No.: US 11,637,506 B2
(45) Date of Patent: Apr. 25, 2023

(54) LOW LOSS SHUNT REGULATOR

(71) Applicant: Polaris Industries Inc., Medina, MN (US)

(72) Inventors: Stephen G. Crain, Wyoming, MN (US); Markus Hoffet, Aarberg (CH)

(73) Assignee: Polaris Industries Inc., Medina, MN (US)

( * ) Notice: Subject to any disclaimer, the term of this patent is extended or adjusted under 35 U.S.C. 154(b) by 99 days.

(21) Appl. No.: 15/867,492

(22) Filed: Jan. 10, 2018

(65) Prior Publication Data
US 2019/0214921 A1    Jul. 11, 2019

(51) Int. Cl.
| | |
|---|---|
| *H02M 7/00* | (2006.01) |
| *H02M 7/217* | (2006.01) |
| *H02M 1/08* | (2006.01) |
| *B60R 16/03* | (2006.01) |
| *H02P 9/30* | (2006.01) |
| *H02P 9/48* | (2006.01) |
| *H02P 9/10* | (2006.01) |
| *H02P 9/00* | (2006.01) |
| *H02P 29/68* | (2016.01) |

(Continued)

(52) U.S. Cl.
CPC ......... *H02M 7/2173* (2013.01); *B60L 15/007* (2013.01); *B60L 50/30* (2019.02); *B60R 16/03* (2013.01); *H02M 1/08* (2013.01); *H02P 9/006* (2013.01); *H02P 9/10* (2013.01); *H02P 9/107* (2013.01); *H02P 9/305* (2013.01); *H02P 9/48* (2013.01); *H02P 29/68* (2016.02); *B60L 2210/14* (2013.01); *B60L 2210/40* (2013.01); *H02M 1/0048* (2021.05); *H02P 2101/25* (2015.01); *H02P 2101/45* (2015.01); *H02P 2201/03* (2013.01)

(58) Field of Classification Search
CPC ...... H02M 7/02; H02M 7/217; H02M 7/2173; H02M 7/217
USPC .......................................................... 307/9.1
See application file for complete search history.

(56) References Cited

U.S. PATENT DOCUMENTS

| | | | | |
|---|---|---|---|---|
| 4,061,121 A | * | 12/1977 | MacLeod | .................. F02P 1/00 |
| | | | | 123/149 R |
| 5,642,021 A | * | 6/1997 | Liang | ........................ H02P 9/48 |
| | | | | 318/146 |

(Continued)

FOREIGN PATENT DOCUMENTS

| | | |
|---|---|---|
| WO | WO 2013/014115 | 1/2013 |
| WO | WO 2016/092565 | 6/2016 |

OTHER PUBLICATIONS

International Search Report issued by the European Patent Office, dated Apr. 5, 2019, for International Patent Application No. PCT/US2019/013043; 6 pages.

(Continued)

*Primary Examiner* — Adi Amrany
(74) *Attorney, Agent, or Firm* — Faegre Drinker Biddle & Reath LLP (57) ABSTRACT

A direct-current (DC) power generation system for a vehicle, a boosting shunt regulator, and a method of regulating the output of an AC generator with the boosting shunt regulator are provided. The boosting shunt regulator includes gated power switches electrically coupled between AC generator contacts and output contacts. A shunt operates the power switches at duty cycles selected to boost the AC voltages output by the AC generator.

22 Claims, 8 Drawing Sheets

(51) Int. Cl.
*B60L 15/00* (2006.01)
*B60L 50/30* (2019.01)
*H02P 101/25* (2016.01)
*H02P 101/45* (2016.01)
*H02M 1/00* (2006.01)

(56) References Cited

U.S. PATENT DOCUMENTS

| | | | | |
|---|---|---|---|---|
| 5,648,705 | A * | 7/1997 | Sitar | H02J 7/1492 |
| | | | | 318/145 |
| 6,081,084 | A * | 6/2000 | Crecelius | H02J 7/1492 |
| | | | | 318/145 |
| 6,137,702 | A * | 10/2000 | Hall | H02M 3/157 |
| | | | | 323/272 |
| 6,239,996 | B1 * | 5/2001 | Perreault | H02P 6/182 |
| | | | | 363/89 |
| 6,713,990 | B1 * | 3/2004 | Giraud | H02P 9/305 |
| | | | | 322/23 |
| 7,402,962 | B1 * | 7/2008 | Fong | H05B 33/08 |
| | | | | 315/299 |
| 7,609,037 | B1 * | 10/2009 | Herbert | H02M 3/28 |
| | | | | 323/266 |
| 9,490,702 | B1 | 11/2016 | Zhak | H02M 1/08 |
| 9,564,799 | B2 * | 2/2017 | Nandi | H02M 1/4225 |
| 2003/0019464 | A1 * | 1/2003 | Morii | F02B 67/00 |
| | | | | 123/198 R |
| 2003/0075997 | A1 * | 4/2003 | Keim | H02P 9/48 |
| | | | | 310/68 D |
| 2005/0146234 | A1 * | 7/2005 | Hashiba | H02K 21/222 |
| | | | | 310/64 |
| 2006/0128521 | A1 * | 6/2006 | Fukushima | B60W 10/06 |
| | | | | 477/5 |
| 2009/0066408 | A1 * | 3/2009 | Fujiwara | H02M 3/07 |
| | | | | 327/536 |
| 2009/0122582 | A1 * | 5/2009 | Ye | H02M 1/4233 |
| | | | | 363/89 |
| 2009/0237019 | A1 * | 9/2009 | Yamakawa | H02P 23/04 |
| | | | | 318/400.09 |
| 2009/0303762 | A1 * | 12/2009 | Jang | H02M 1/4208 |
| | | | | 363/61 |
| 2010/0007497 | A1 * | 1/2010 | Takeda | B60R 25/045 |
| | | | | 340/572.1 |
| 2012/0249091 | A1 * | 10/2012 | Chen | H02M 1/4225 |
| | | | | 323/207 |
| 2013/0091872 | A1 * | 4/2013 | Hurych | H02M 7/2173 |
| | | | | 62/56 |
| 2013/0113283 | A1 | 9/2013 | Shiek | |
| 2013/0272042 | A1 * | 10/2013 | Moallem | H02M 1/4216 |
| | | | | 363/89 |
| 2014/0266110 | A1 * | 9/2014 | Yuan | H02M 3/156 |
| | | | | 323/282 |
| 2016/0339857 | A1 * | 11/2016 | Crain | B62M 27/02 |
| 2016/0339997 | A1 * | 11/2016 | Crain | B60L 50/10 |
| 2017/0077818 | A1 * | 3/2017 | Werner | H02M 1/42 |
| 2017/0077853 | A1 | 3/2017 | Zook | |
| 2018/0086419 | A1 * | 3/2018 | Crain | H02K 7/1815 |
| 2018/0191199 | A1 * | 7/2018 | Kim | H02M 3/156 |

OTHER PUBLICATIONS

Written Opinion of the International Searching Authority, dated Apr. 5, 2019, for International Patent Application No. PCT/US2019/013043; 10 pages.

International Preliminary Report on Patentability issued by the European Patent Office, dated May 7, 2020, for International Patent Application No. PCT/US2019/013043; 23 pages.

Office Action issued by the Canadian Intellectual Property Office, dated Aug. 12, 2021, for Canadian Patent Application No. 3,088,167; 7 pages.

* cited by examiner

LOW LOSS SHUNT REGULATOR

CROSS-REFERENCE TO RELATED APPLICATIONS

None.

TECHNICAL FIELD

The present disclosure relates to power generation systems of a vehicle and more particularly to a shunt regulator of AC voltage.

BACKGROUND OF THE DISCLOSURE

Generally, vehicles include any apparatus comprising a propulsion system and a passenger space. Examples of vehicles include motorcycles, automobiles, recreational vehicles, off-road vehicles, all-terrain vehicles (ATVs), snowmobiles, and others. Electrical power requirements in recreational vehicles, including off-road vehicles, ATVs, snowmobiles, and others, continue to rise as a consequence of increasing electrical loads. Growing electrical power requirements are driving the need for increased power output from the magneto or alternator charging systems that serve as the core of a vehicle's electrical system. Traditionally, magneto size has been scaled to meet increasing electrical power demands, which results in increased cost.

The power generation systems of many vehicles operate at a fixed load voltage. A load voltage is selected and the charging system is operated at this voltage throughout the RPM range. Such a system results in reduced power at low and high engine speeds and causes the charging system to compromise between power needed at high engine speeds and power needed for engine starting/idling. In addition, some engines, such as air-cooled engines of snowmobiles for example, are prone to overheating when large currents are produced by the magneto to provide the required vehicle power at the fixed load voltage.

Some vehicles may include a manual start system, such as a recoil start or a kick start system, for starting the engine of the vehicle. Manual start systems may generate low engine speeds insufficient to produce sufficient power to energize the engine control unit, thereby requiring multiple manual start attempts. Furthermore, some vehicles may include a plow or other work tool that is driven by a winch or other electric machine that draws power from the power generation system. The engine speed may not be sufficient to maintain proper power levels to other loads while the electric machine draws power during the plow operation. For example, the battery charge level may not be sufficiently maintained during plowing as a result of the current draw by the plow.

Accordingly, there is a need for improved power generation systems which generate sufficient power at varying flywheel speeds.

SUMMARY OF CLAIMED EMBODIMENTS

The present disclosure provides a shunt regulator operative to harvest larger amounts of power from an alternating-current (AC) generator than conventional regulators. In some embodiments, the AC generator has fewer windings than a conventional generator and thereby produces a lower voltage output, which in combination with the novel shunt regulator enables the power generation system to generate more power at low and high revolutions per minute of the engine. In one example, the nominal rectified voltage of the AC generator is about 50% less than the direct-current (DC) buss voltage of the vehicle. Accordingly, the low voltage is boosted by the shunt regulator to generate the DC bus voltage.

In some embodiments, the shunt regulator utilizes low loss field effect transistors (FETs) to implement switching transformations more efficiently than conventional regulators, permitting construction of a regulator in which the power switches are not potted.

In some embodiments, the shunt regulator comprises an enclosure with two shrouds, three contacts within each shroud, one of the contacts providing bi-modal local interconnect network (LIN) communications or other single wire serial communication methods. The regulator can thus be connected to the engine of the vehicle by simultaneously and conveniently connecting the contacts for the AC generator, the output contacts, and the LIN contact. Of course the utility of the novel enclosure is not limited to use with the embodiments of the shunt regulator described herein but may be used with any regulator. Similarly, utility of the bi-modal LIN contact and mode of operation is applicable to any enclosure or regulator and is not limited to use with the embodiments of the shunt regulator described herein.

In some embodiments, a method of electrical power generation in a vehicle having a combustion engine is provided, the method comprising: receiving, by a shunt regulator including a shunt controller, AC power from an AC generator mechanically coupled to the combustion engine, wherein the AC generator is operable to generate AC voltages including a nominal AC voltage at an idle speed of the vehicle when operating at a peak power point; and, by the shunt controller, operating the power switches at duty cycles selected to boost the nominal AC voltage to a DC bus voltage, and responsive to changes in the load in a first mode of operation, boost the AC voltages to the DC bus voltage.

In some embodiments, a shunt regulator for a vehicle is provided, the shunt regulator comprising: a first output contact and a second output contact, the first output contact and the second output contact adapted to electrically connect a load to the shunt regulator, wherein a DC bus voltage is available to the load between the first output contact and the second output contact; AC generator contacts adapted to electrically connect an AC voltage generator to the shunt regulator, wherein the AC generator is operable to generate AC voltages including a nominal AC voltage at an idle speed of the vehicle when operating at a peak power point; gated power switches electrically coupled between the AC generator contacts and the first output contact and between the AC generator contacts and the second output contact, each of the gated power switches comprising a gate operable to control current flow through the respective gated power switch; and a shunt controller communicatively coupled to the gates of the gated power switches, the shunt controller configured to operate the power switches at duty cycles selected to boost the AC voltages, including the nominal AC voltage, to generate the DC bus voltage.

In some embodiments, a DC power generation system for a vehicle is provided, the system comprising: an AC generator including windings operable to generate AC voltages including a nominal AC voltage at an idle speed of the vehicle when operating at a peak power point; a shunt regulator operable to boost the AC voltages to generate a DC bus voltage, wherein the nominal AC voltage is insufficient without boosting to generate the DC bus voltage, the shunt regulator including: a first output contact and a second output contact, the first output contact and the second output contact adapted to electrically connect a load to the shunt regulator, wherein the DC bus voltage is available to the load between the first output contact and the second output contact; gated power switches electrically coupled between the windings of the AC generator and the first output contact, each of the gated power switches comprising a gate operable to control current flow through the respective gated power switch; and a shunt controller communicatively coupled to the gates of the gated power switches, the shunt controller configured to operate the power switches at duty cycles selected to boost the AC voltages to generate the DC bus voltage.

DETAILED DESCRIPTION

For the purposes of promoting an understanding of the principles of the disclosure, reference will now be made to the embodiments illustrated in the drawings, which are described below. Corresponding reference characters indicate corresponding parts throughout the several views.

The present disclosure provides a shunt regulator operative to harvest larger amounts of power from an AC generator than conventional regulators. In some embodiments, the AC generator (which may be referred to as a low voltage AC generator) has fewer windings than a conventional generator and thereby produces a lower voltage output, which in combination with the novel shunt regulator enables the power generation system to generate more power at low and high revolutions per minute of the engine. Advantageously, the low voltage AC generator extends regulation into higher RPM ranges compared to AC generators whose unboosted rectified DC voltage satisfies the DC bus voltage requirements at idle, capturing additional power. In one example, the nominal rectified (without boosting) voltage of the low voltage AC generator is about 50% less than the DC buss voltage of the vehicle. Accordingly, the low voltage is boosted by the shunt regulator to generate the DC bus voltage. Low voltage AC generators include generators that produce voltage that, when rectified without boosting, is less than the DC bus voltage. In one example, the unboosted rectified voltage is no more than 80% of the DC bus voltage. In another example, the unboosted rectified voltage is no more than 60% of the DC bus voltage.

In some embodiments, the shunt regulator utilizes low loss field effect transistors (FETs) to implement switching transformations more efficiently than conventional regulators, permitting construction of a regulator in which the power switches are not potted. Potting adds weight, requires time to cure, and prevents reworking of circuits. Replacing the potting with air therefore provides significant weight and cost savings.

Use of low loss FETs in combination with a low voltage AC generator has many benefits. Heat reduction by using low loss devices reduces thermal stress and thereby increases reliability. Heat reduction also enables placement of the shunt regulator anywhere an engine control module or vehicle control module could be placed. Without heat reduction the regulator must be placed in the path of airflow sufficient to cool the regulator, typically in front of a radiator. Such placement requires use of long wire harnesses that can be eliminated by use of the novel shunt regulator provided herein.

Boosting the AC voltage at idle may enable use of smaller AC generator flywheels and thereby reduce cost. The novel shunt regulator provided herein may be capable of increasing power at idle permitting batteryless operation of the vehicle. Furthermore, voltage control based on duty cycle control can reduce torque change with load switching, such as when a radiator fan starts or stops, improving idle stability, can reduce voltage ripple and provide faster load change response, and reduce load dump (load removal) surge voltage.

Figure 1:
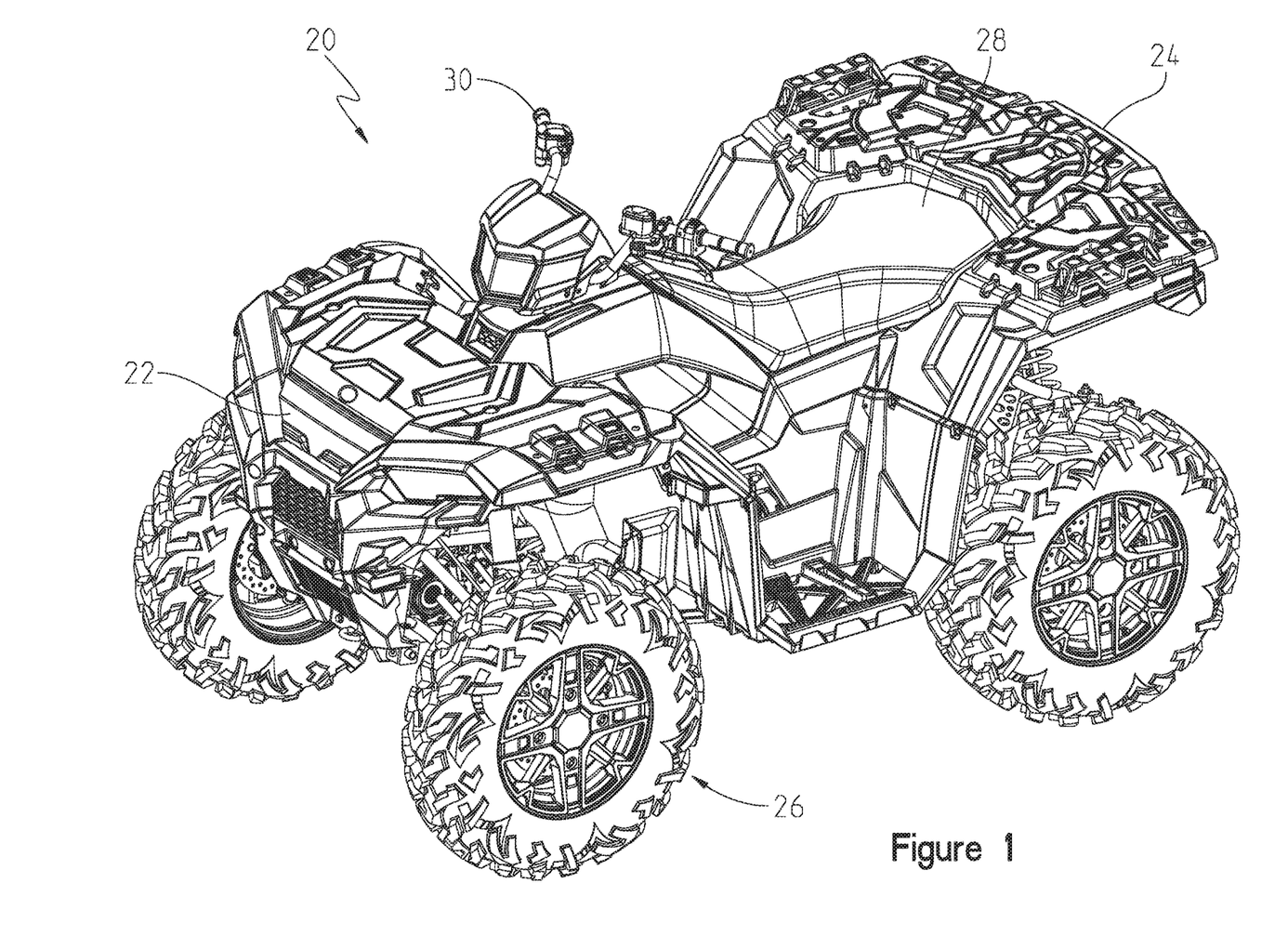
FIG. 1 is a left front perspective view of an all-terrain vehicle in accordance with embodiments of the present disclosure.
Figure 2:
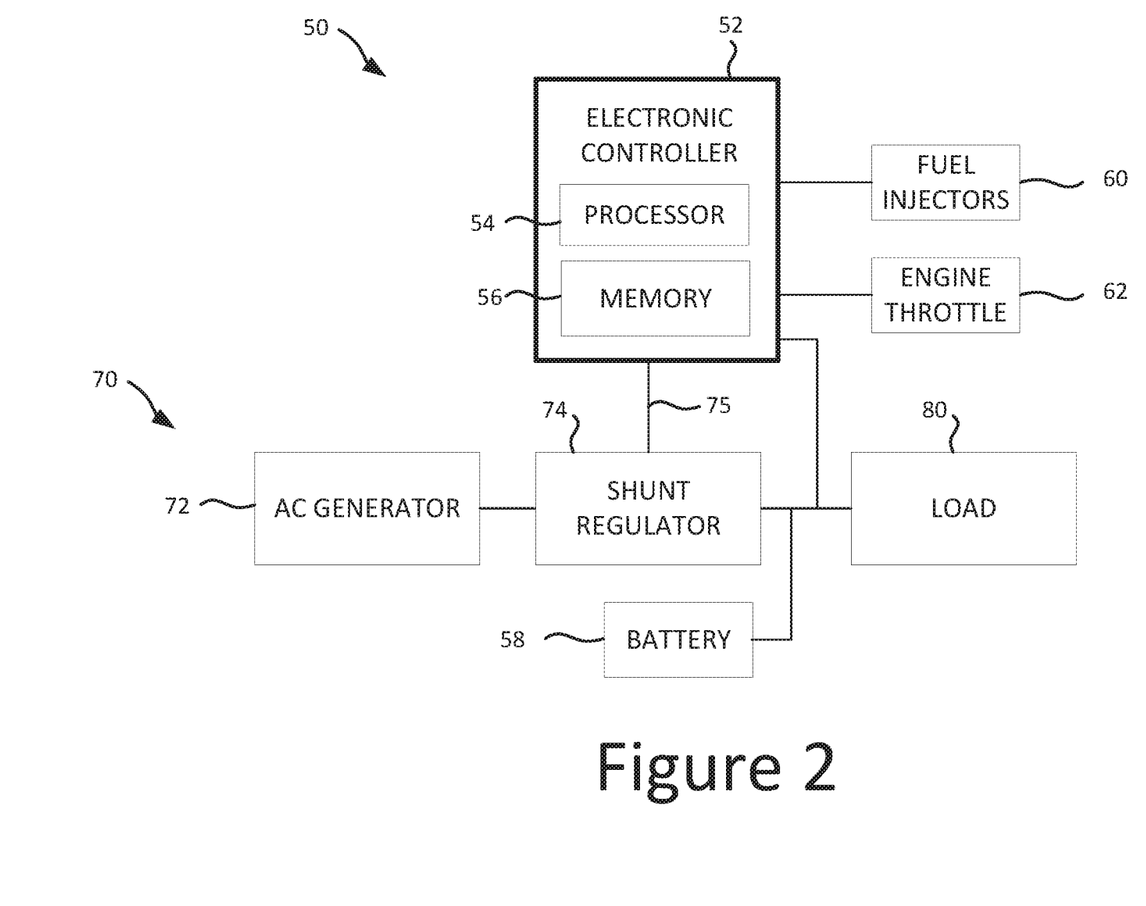
FIG. 2 is a block diagram of a vehicle control system including a shunt regulator.

FIG. 1 is a perspective view of a vehicle 20, illustratively an ATV, including an engine 22 on a front end and a storage rack 24 on a rear end of the vehicle. A plurality of wheels 26 support a frame of the vehicle. Vehicle 20 also includes a seat assembly 28 and a steering assembly 30 supported by the frame. Referring to FIG. 2, vehicle 20 further comprises a control system 50 including an electronic controller 52 to control fuel injectors 60 and a throttle 62. Electronic controller 52 may receive DC power from a battery 58 and from a DC power generation system 70 coupled to supply power to an electrical load 80. Electrical load 80 may comprise, for example, battery 58, a circuit to energize fuel injectors 60 and spark plugs (not shown) of engine 22, electronic controller 52, and other vehicle components and accessories. Electronic controller 52 may be a conventional engine controller comprising a processor 54 and a memory 56. Memory 56 comprises software and/or firmware including processing instructions executable by processor 54 to control vehicle 20. More generally, electronic controller 52 comprises control logic to perform the control functions. The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed. Control logic may be distributed and may include one or more physical control modules in communication with one another. Memory 56 comprises any suitable computer readable medium that is accessible by the processor(s) 54 of controller 52. Memory 56 may be a single storage device or multiple storage devices, may be located internally or externally to controller 52, and may include both volatile and non-volatile media. Exemplary memory 56 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by controller 52.

Figure 3:
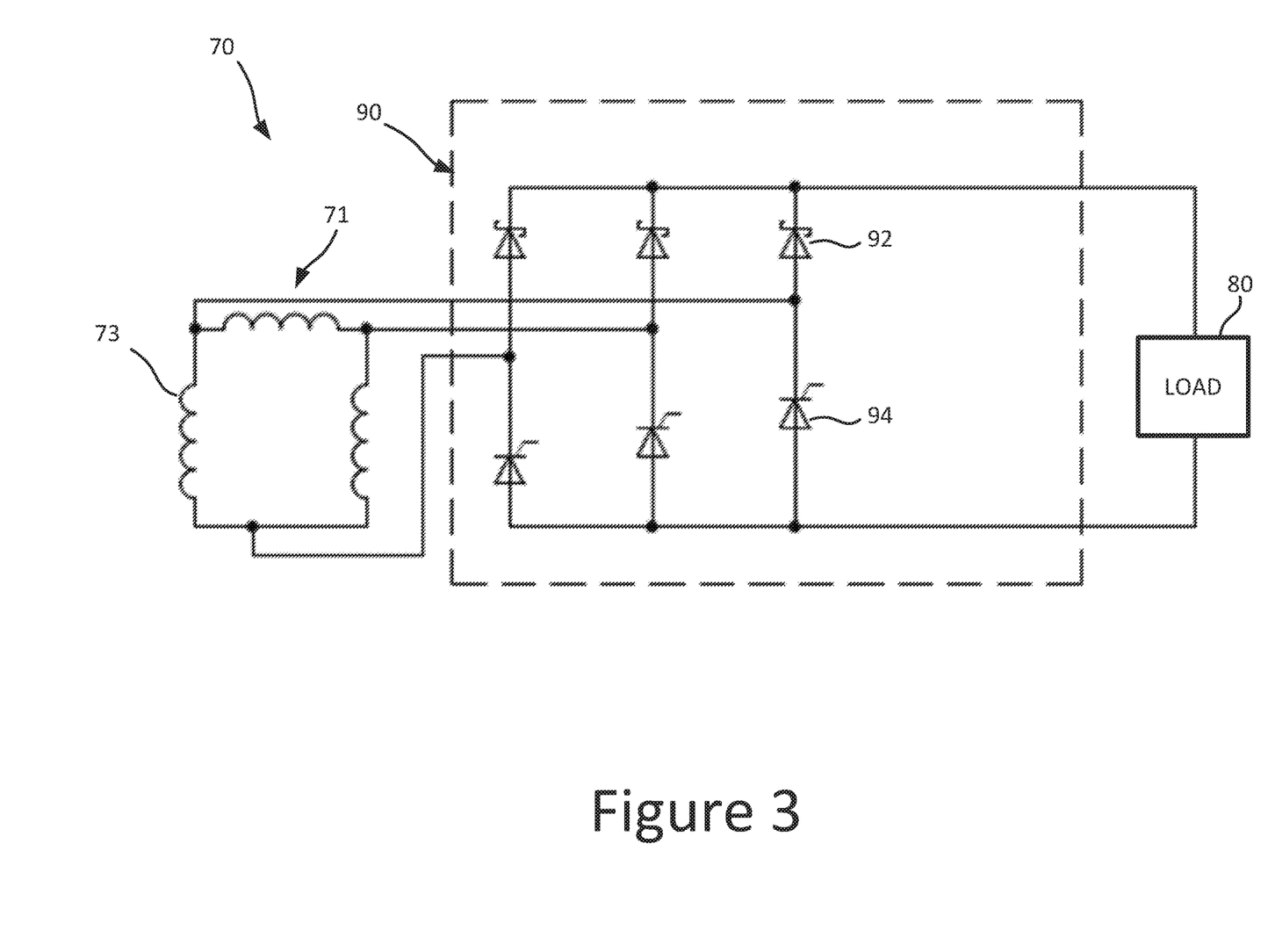
FIGS. 3 and 4 are electrical diagrams of embodiments of rectification circuits comprising passive and gated power devices.
Figure 4:
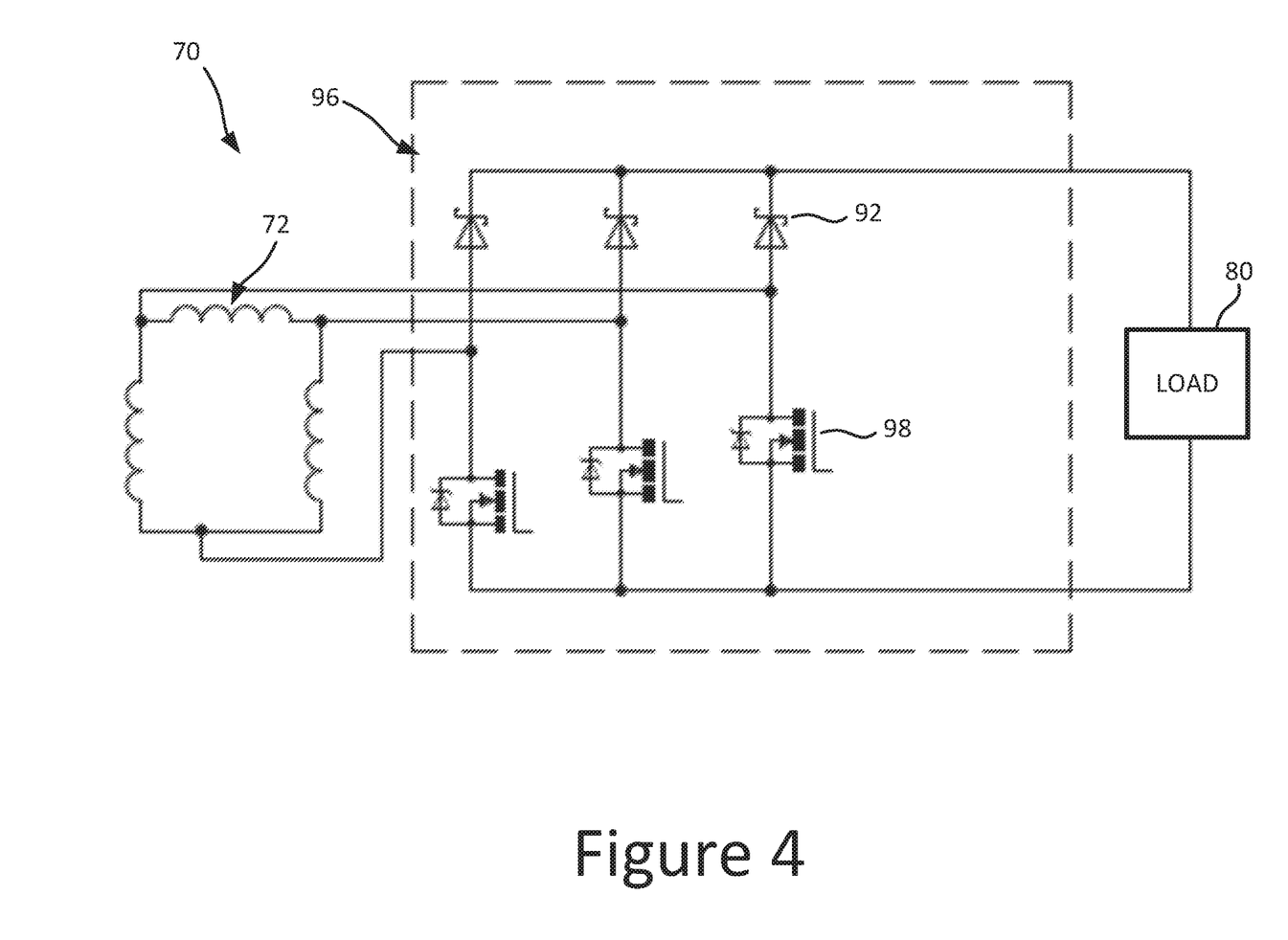
Figure 5:
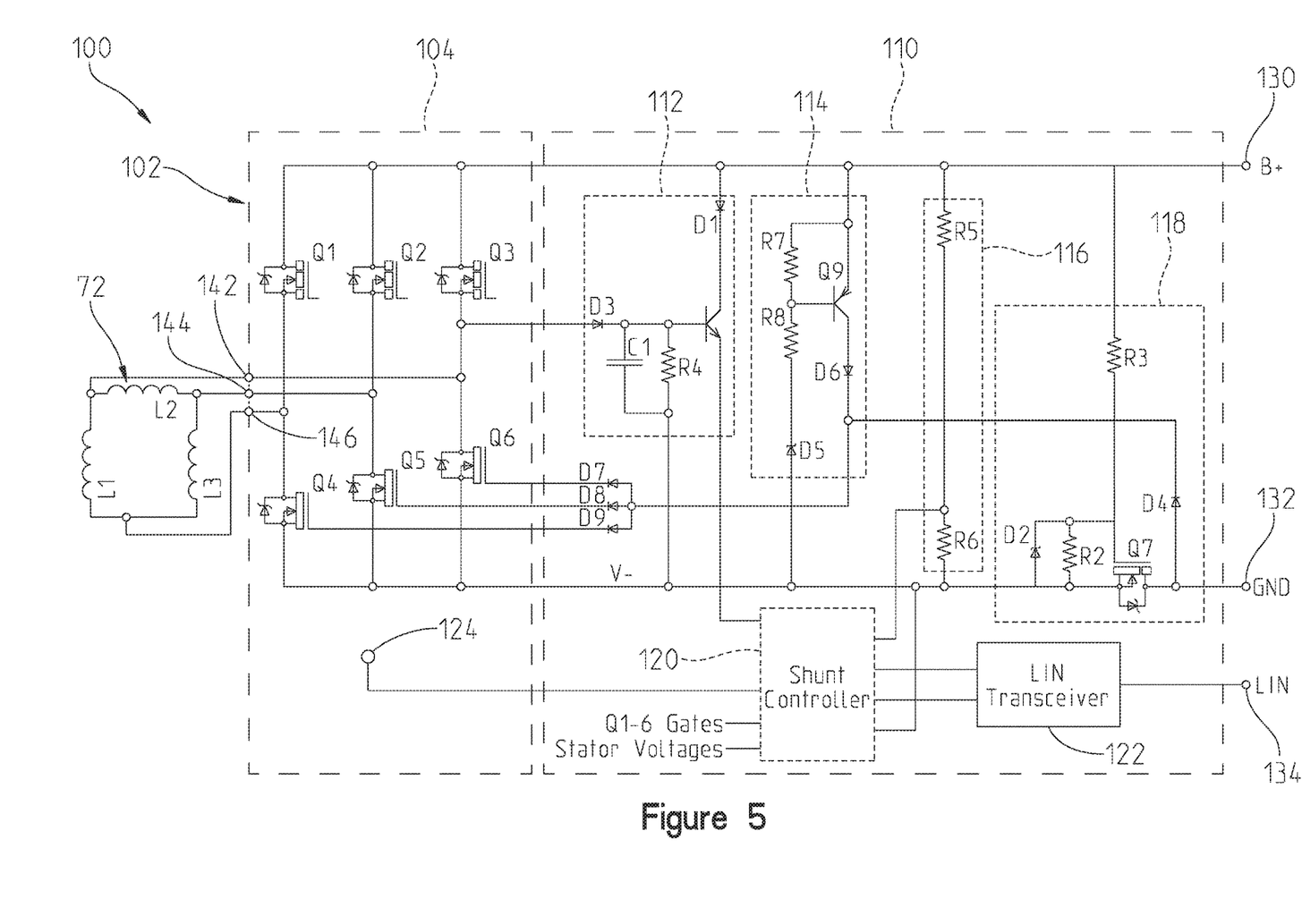
FIG. 5 is an electrical diagram of an embodiment of a low loss shunt regulator.

A low voltage AC generator 72 is mechanically coupled to engine 22. Rotation of engine 22 causes AC generator 72 to rotate and generate a rotating magnetic field which induces AC power on windings of AC generator 72. The AC power is supplied to shunt regulator 74. Examples of AC generator 72 include a magneto or alternator. AC generator 72 may comprise a plurality of phases. While three-phase generators are shown in FIGS. 3-5, AC generator 72 may comprise more or less phases. More phases increase complexity but also may enable reduction of DC voltage ripple. The selection of the AC generator may be based on requirements of the vehicle such as cost, refinement of the control system, presence or absence of smoothing capacitors or the battery, and other factors. Shunt regulator 74 is operative to control the generation and delivery of DC power based on AC power provided by generator 72. A communications line 75 enables communication between controller 52 and shunt regulator 74. The communications protocol for data transfer may be a serial communications protocol. In one variation, the serial communications comprise a LIN network (defined below). Via the LIN network controller 75 may cause shunt regulator 74 to increase or decrease the output voltage relative to the DC bus voltage, for example by increasing the output voltage by 10% in cold conditions or reducing the output voltage by 10% based on battery or temperature conditions.

In a typical rectification circuit comprising only passive power components, such as diodes, the output of the rectification circuit is directly proportional to the output of the AC generator. As the engine speed increases, the voltage and frequency of the AC generator, and thus the DC voltage output of the rectification circuit, also increase. The power output, however, varies with the load. The power output is zero at the open circuit voltage, since there is no current flow, and it is substantially equal to zero at the short circuit voltage, which causes the voltage output by the windings to collapse. Approximately half-way between the open circuit and short circuit voltages the power output reaches its peak, referred to as the peak power point voltage. In operation, at a particular engine speed, the power output increases from zero as the voltage increases in response to changes in the load, up to the peak power point voltage, and then decreases as the voltage continues to increase. Operating at the peak power point results in the highest power generation. Of course the amount of power produced at the peak power point increases with the engine speed.

In embodiments of the invention, active switching components are used to shunt the windings of the AC generator to boost its voltage output. FIG. 3 is a schematic diagram of an embodiment of DC power generation system 70 including a AC generator 71 having three windings 73 connected in a delta configuration. The windings are coupled to a series regulator 90 comprising three passive components 92, illustratively diodes, and three gated power switches 94, illustratively silicon controlled rectifiers (SCRs). Gated power switches may be referred to as active power switches, to reflect that their function is controllable. In the series regulator, the SCRs are gated to open-circuit the windings to prevent overcharging.

FIG. 4 presents another embodiment of DC power generation system 70 including low voltage AC generator 72 and a shunt regulator 96 comprising three passive components 92, illustratively diodes, and three gated power switches 98, illustratively metal-oxide semiconductor field-effect transistors (MOSFETs). Gated power switches may also comprise insulated-gate bipolar transistors (IGBTs). MOSFETs are more efficient than either diodes or SCRs. In the shunt regulator, the MOSFETs are gated to short-circuit the windings to prevent overcharging. The timing is such that the AC voltage is not boosted, it is only shunted. Shunt regulator 96 may comprise shunt controller 120 which controls the MOSFETs at selected duty cycles to boost the AC voltage, as described below.

FIG. 5 is a schematic diagram of a further embodiment of a DC power generation system for a vehicle. The system, denoted by numeral 100, comprises low voltage AC generator 72 including windings L1, L2, L3 operable to generate AC voltages including a nominal AC voltage at an idle speed of the vehicle when operating at a peak power point. System 100 further comprises a low loss shunt regulator 102 operable to boost the AC voltages to a DC bus voltage, wherein the nominal AC voltage is insufficient without boosting to generate the DC bus voltage when rectified, ergo the name "low voltage". In one example, the DC bus voltage is about 14 volts and the nominal unboosted rectified voltage is 7 volts. Therefore boosting is available with the low voltage AC generator to raise the average DC output voltage from 7 to 14 volts. By contrast with the regulator of FIG. 4, which uses MOSFETs only on the low-side of the power circuit, low loss shunt regulator 102 comprises only low loss gated power switches, e.g. MOSFETs on both the low and the high sides of the power circuit. More generally, low loss FETs have power losses which are less than 10% of the power output, and preferably less than 7% of the power output. At idle, a low loss shunt rectifier comprising MOSFETs may have 2.2 watts of losses to produce 462 watts of power output. By contrast, a regulator, e.g. regulators 90, 92, comprising diodes may have 66.0 watts of losses to produce the same power output. The losses equate to heat, therefore the less efficient circuits generate more heat. As discussed further below, use of MOSFETs (or any other transistor circuit with low power losses) enables beneficial changes in the construction of the shunt regulator, such as the elimination of potting and related problems.

Shunt regulator 102 has contacts 142, 144, 146 provided to electrically couple windings L1, L2, L3 of AC generator 72. Shunt regulator 102 comprises a power circuit 104 and a control circuit 110 comprising a shutdown circuit 112, a protection circuit 114, a voltage sensing circuit 116, a voltage polarity circuit 118, a shunt controller 120, a temperature sensor 124, a LIN transceiver 122, a first output contact 130, a second output contact 132, and a LIN contact 134.

Power circuit 104 includes gated power switches Q1-Q6 electrically coupled between the windings of the AC generator and the first and second output contacts. Shunt controller 120 controls gated power switches Q1-Q6 to generate a desired, e.g. DC bus, voltage between the first output contact and the second output contact. Each of the gated power switches comprises a gate operable to control current flow through the respective gated power switch. Examples of gated power switches include SCRs, MOSFETs, and IGBTs. Shunt controller 120 is communicatively coupled to the gates of the gated power switches. The shunt controller is configured to operate the power switches at duty cycles selected to, in a first mode of operation, boost the AC voltages to generate the DC bus voltage. In some variations, the duty cycles are selected to respond to changes in the load to thereby maintain the DC bus voltage.

In a variation of the present embodiment, the shunt controller is further configured, in a second mode of operation, to limit the duty cycles to minimum duty cycles corresponding to rotational speeds of the AC generator. The second mode of operation takes effect when the first mode of operation would apply a duty cycle that is less than the minimum duty cycle. At that time instead of the determined duty cycle the minimum duty cycle for the particular rotational speed is imposed.

Shutdown circuit 112 comprises a diode D1 coupled to the first output contact and a transistor coupled to shunt controller 120. A diode D3 is connected to a winding and to the gate of the transistor, and its voltage is pulled-down by a capacitor C1 and a resistor R4. When the voltage of C1 is low enough, the transistor output indicates to shunt controller 120 a shutdown signal, and shunt controller 120 shuts down. Alternatively, the output signal from shutdown circuit 112 powers shunt controller 120 and a low voltage of C1 causes power to shunt controller 120 to be interrupted.

Protection circuit 114 comprises resistors R7 and R8, diodes D5 and D6, and transistor Q9. Resistors R7 and R8 form a voltage divider circuit coupled to the gate of transistor Q9. When the output voltage is too high, transistor Q9 conducts current to diodes D7-D9 which in turn on the gated power switches to protect the shunt regulator and the connected loads.

Voltage sensing circuit 116 comprises resistors R5 and R6 which form a voltage divider circuit which provides a scaled voltage to shunt controller 120. As described below, shunt controller 120 utilizes the scaled voltage to regulate the output voltage of the shunt regulator.

Voltage polarity circuit 118 comprises resistors R2 and R3, diodes D2 and D4, and a switch Q7. Diode D2 is a Zener diode. If the load connected to the shunt regulator is the battery, and the battery is connected improperly, in reverse polarity, switch Q7 opens the circuit between the gated power switches and the second contact to protect the battery and the regulator.

Figure 6:
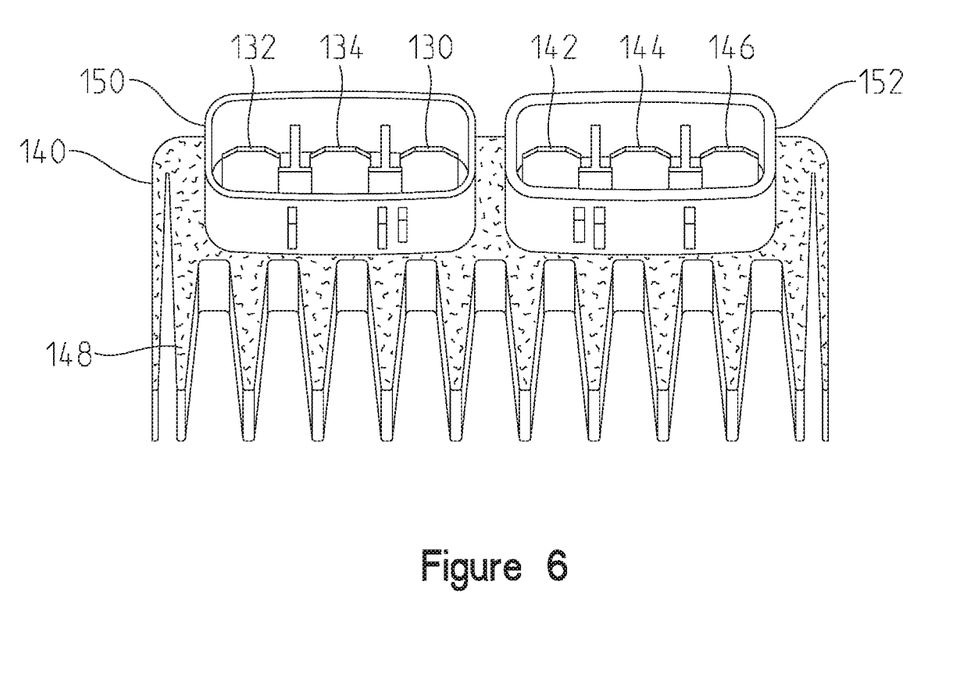
FIG. 6 is a perspective view of a regulator housing.
Figure 7:
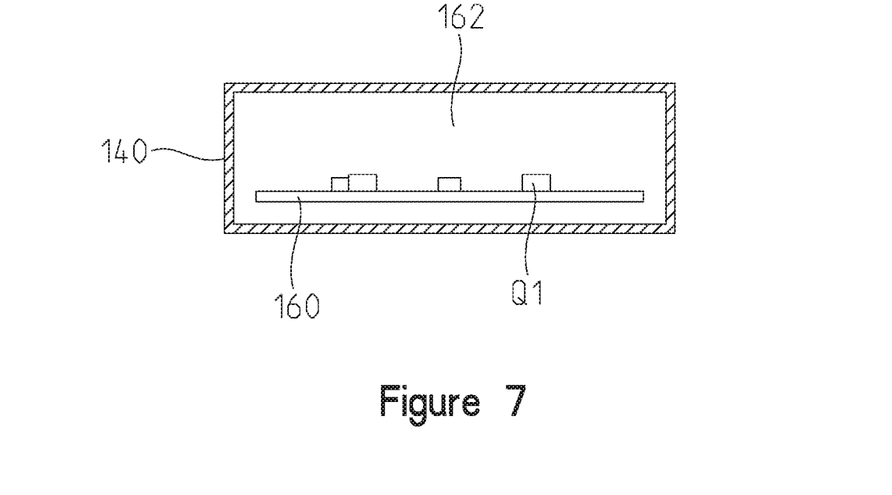
FIG. 7 is a cross-section view of a regulator housing.

As described above, shunt regulator 102 may comprise a housing with various advantageous characteristics. FIG. 6 is a perspective view of an embodiment of a housing, denoted by numeral 140, of shunt regulator 102. Housing 140 includes a plurality of cooling fins 148, a first shroud 150, and a second shroud 152. FIG. 7 is a cross-sectional view of a portion of the housing, not showing the cooling fins. First shroud 150 encloses contacts 130-132 and shroud 152 encloses contacts 142-146. Coupling of housing 140 to the engine of the vehicle concurrently connects shunt regulator 100 to AC generator 72, the DC bus of the engine, and the LIN of the engine. Fins 148 dissipate heat generated by the gated power switches. Inside housing 140 is a circuit board 160 supporting the electrical components of shunt regulator 100. Only a few components are shown. The space within the housing, denoted by numeral 162, is devoid of potting material. Therefore, air surrounds surfaces of the components.

Figure 8:
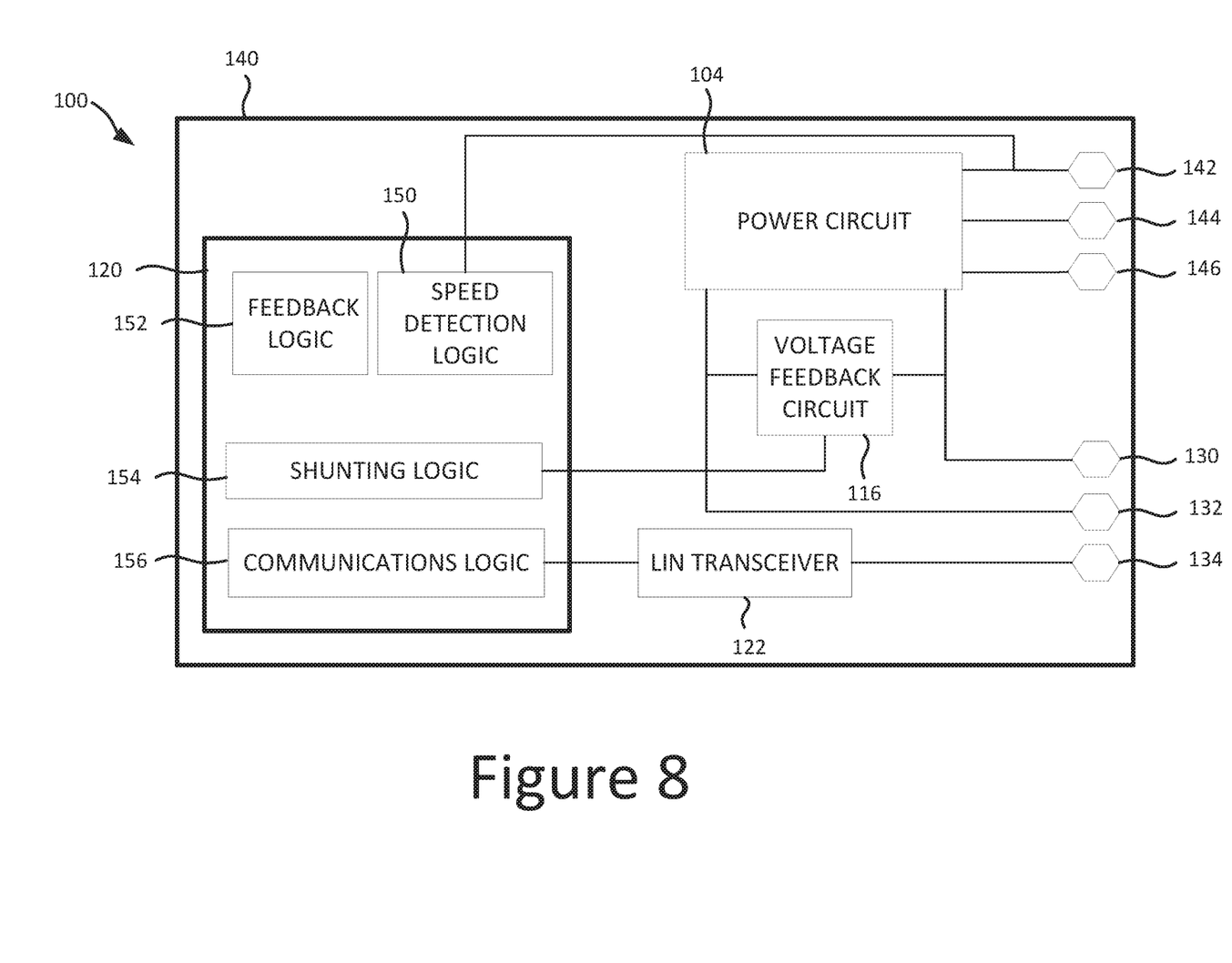
FIG. 8 is a block diagram of the low loss shunt controller of FIG. 5.

In various embodiments, shunt regulator 102 comprises various logic structured to implement the functions of the regulator. Referring to FIG. 8, in one embodiment shunt controller 120 comprises speed detection logic 150, shunting logic 152, feedback logic 154 and communications logic 156. Speed detection logic 150 is structured to determine zero crossings of the AC voltages generated by the AC generator and determine each of the rotational speed of the AC generator based on a time elapsed between the zero crossings. Speed detection logic may comprise any known zero crossing detectors. In one example, speed detection logic 150 comprises an input pin and an algorithm to periodically sense the voltage at the input pin and determine when the voltage transitions from a logic high to a logic low or vice versa, indicating a zero crossing. The algorithm then measures time between consecutive zero crossings. The time multiplied by two represents the period of the AC frequency of the AC voltage and corresponds to the rotational speed of the engine. The rotational speed of the engine is related to the flywheel of the AC generator, for example by belts and pulleys or a gear train. More than one pin may be used to detect zero crossing of each of the windings of the AC generator, e.g. stator windings and voltages. Any known circuit may be used to compatibilize the stator voltages to the input pins of shunt regulator 120, including Zener diodes, capacitors and resistors arranged to clip the voltage peaks or stabilize the stator voltages by, for example, integrating the voltages by means of capacitors. Opto-couplers may also be used to provide electrical isolation.

Feedback logic 152 is structured to determine the actual DC output voltage at the output contacts, and, optionally, control the duty cycle of the gated power switches to maintain the actual DC voltage about the DC bus voltage. A voltage feedback circuit, illustratively voltage sensing circuit 116, senses the actual DC output voltage. Feedback logic 154 compares the actual DC output voltage to the DC bus voltage to determine an error value indicative of a difference between them. As used herein the DC bus voltage is the desired or target DC output voltage, distinguishable from the actual DC output voltage, which may be referred to as the DC output voltage, which exhibits ripple or variation inherent in switching systems. In one variation, feedback logic 152 provides the error value to shunting logic 154. In another variation, feedback logic 152 determines a duty cycle based on the error. Larger errors result in larger duty cycles, or duty cycle increases, if the actual DC output voltage is less than the DC bus voltage, so as to increase the voltage, and vice versa. A linear function (straight or arcuate) of duty cycle vs. error may be used to determine how aggressively to compensate for the error. An arcuate function would compensate more aggressively than a linear function. Feedback logic 152 may comprise look-up tables, maps, or mathematical models representing the duty cycle vs. error function. A PID controller may also be used to generate a duty signal from the error signal.

Shunting logic 154 generates the gate signals for the gated power switches, which are output by shunt controller 120 to the gates or to a PWM controller that generates the corresponding signals. PWM controllers are well known in the art. The gates may be switched at frequencies higher than the frequency of the AC voltage. In one example, the frequency of switching is between 5 KHz and 10 KHz. Shunting logic 154 may comprise look-up tables, maps, or mathematical models to determine the duty cycle. In one variation, in a first mode of operation shunting logic 154 receives the error signal from feedback logic 152 and uses look-up tables, maps, or mathematical models representing the linear function of duty cycle vs. error to determine the duty cycle based on the error. In another variation, in a second mode of operation (described above), shunting logic 154 uses look-up tables, maps, or mathematical models representing a function of rotational speed vs. minimum duty cycle to ensure the duty cycle is not less than the minimum duty cycle at each rotational speed. An example of a table is shown below, i.e. Table 1. In one example, shunting logic 154 selects a table value with the lowest revolutions per minute (RPM) above the determined rotational speed and reads the corresponding permitted minimum duty cycle or equivalent maximum boost percentage. Boost percentage=1-Duty cycle. The values of Table 1 were calculated as max boost=$100*(1-(V_{peak\_power}/DC\ bus\ voltage))$, clamped between 2% and 98%. Maximum boost is achieved when the ratio of Vpeak_power/DC output voltage=1, e.g. when the DC output voltage equals the peak power voltage. By limiting the boosting amount the voltage does not increase past the peak power point voltage. The peak power can be determined using a diode bridge to measure, at each RPM, the current and voltage, multiplying current and voltage to obtain power, and varying a load iteratively to find the maximum power point. As indicated below, boosting is much greater at low speeds than at high speeds.

TABLE 1

| RPM | Max Boost | Min Duty Cycle |
| --- | --- | --- |
| 200 | 86 | 14 |
| 250 | 83 | 17 |
| 300 | 81 | 19 |
| 350 | 75 | 25 |
| 425 | 69 | 31 |
| 500 | 64 | 36 |
| 600 | 56 | 44 |
| 725 | 52 | 48 |
| 875 | 36 | 64 |
| 1050 | 24 | 76 |
| 1250 | 8 | 92 |
| 1500 | 2 | 98 |
| 1800 | 2 | 98 |
| 2150 | 2 | 98 |

Communications logic 156 may function in conjunction with temperature sensor 124, LIN transceiver 122 and LIN contact 134, in a first operating mode, to signal an overheat condition by changing a logical state of the LIN contact, and to receive a transition command via the LIN contact and transition to a second operating mode responsive to the transition command, wherein in the second operating mode the LIN transceiver is operable to send and receive data over the LIN contact. In the first operating mode communications logic 156 monitors the temperature of power circuit 104 via temperature sensor 124 and compares the temperature to a high temperature threshold. If the temperature exceeds the high temperature threshold (an over-temperature condition), communications logic 156 instructs LIN transceiver 122 to invert the output of LIN contact 134 so that a process monitoring the output will identify the inversion or the new state of LIN contact 134 and indicate a fault to the user of the vehicle, for example via a dashboard light. For example, LIN contact 134 may be pulled down to a low logical state to signal the overheat condition. LIN contact 134 may be pulled down until the overheat condition clears. Meanwhile LIN transceiver 122 monitors LIN contact 134 awaiting a transition command from a LIN master. LIN protocols are known in the art and will therefore not be described here in additional detail. Upon receipt of the transition command LIN transceiver 122 conveys the command to communications logic 156 and communications logic 156 transitions to a second operating mode and begins to convey data for transmission to the LIN master or to receive data from the LIN master via LIN transceiver 122. Communications logic 156 remains in the second operating mode until the shunt regulator powers down. The data may comprise calibration data, for example the target DC bus voltage and a voltage boost table comprising the desired duty cycle vs. error values or the minimum duty cycle values. The data may also comprise real-time voltage control commands. For example, the LIN master may command an increased target DC voltage to accelerate battery charging, or a lower target DC voltage to reduce power consumption. The LIN master could also command a target DC voltage based on battery temperature to extend battery life. The data may also comprise status information, for example temperature and fault status.

Fault status may include an over-temperature fault or a stator fault detected by comparing the winding voltages to each other or to expected values.

Figure 9:
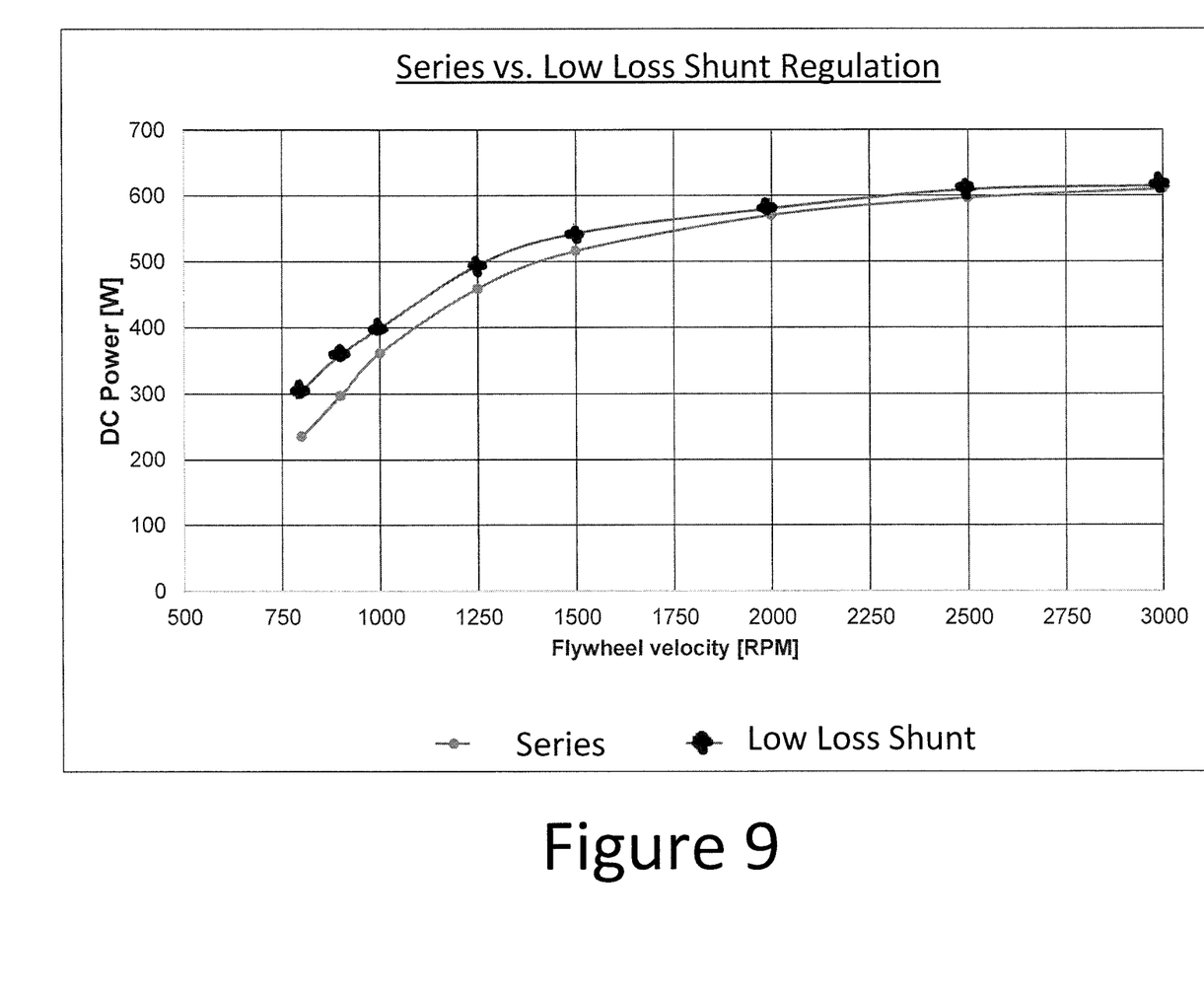
FIG. 9 is graph comparing power outputs at various flywheel speeds of two DC power generation systems including the system of FIG. 5.

FIG. 9 is a graph comparing power outputs of the DC power generation system of FIG. 3 and the DC power generation system of FIG. 5. As shown, at 800 flywheel RPM system 100 generated 30% more power than system 90, with less heat generation.

The scope of the invention described herein is to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C. Therefore, while some features are described in particular embodiments together with other features, the features may also be present in some embodiments independent of the other features. For example, the novel regulator housings and fault communication features may be used in low loss shunt regulators, or with serial regulators, or with non-boosting shunt regulators, with any AC generator, not merely with low voltage generators. The novel fault communication features may be used in any regulator and with any AC generator, not merely with low voltage generators.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Furthermore, no element, component, or method step in the present disclosure is intended to be dedicated to the public regardless of whether the element, component, or method step is explicitly recited in the claims.

While this disclosure has been described as having an exemplary design, this application is intended to cover any variations, uses, or adaptations of the disclosure using its general principles, including such departures from the present disclosure as come within known or customary practice in the art to which this disclosure pertains.

What is claimed is:

1. A direct-current (DC) power generation system for a vehicle, the system comprising:
    an alternating-current (AC) generator including windings operable to generate alternating-current (AC) voltages including a nominal AC voltage at a first speed of the vehicle when operating at a peak power point;
    a shunt regulator operable to boost the AC voltages to a target DC bus voltage, wherein the nominal AC voltage is insufficient without boosting to generate an actual DC output voltage corresponding to the target DC bus voltage, the shunt regulator including:
        a first output contact and a second output contact, the first output contact and the second output contact adapted to electrically connect a load to the shunt regulator;
        gated power switches electrically coupled between the windings of the AC generator and the first output contact, each of the gated power switches comprising a gate operable to control current flow through the respective gated power switch;
        a shunt controller communicatively coupled to the gates of the gated power switches, the shunt controller configured to:
            operate the gated power switches at duty cycles selected to boost the AC voltages to generate the target DC output voltage in a first mode of operation; and
            when the duty cycles in the first mode of operation would be less than minimum duty cycles corresponding to rotational speeds of the AC generator, operate the gated power switches at the minimum duty cycles in a second mode of operation;
        a voltage feedback circuit coupled to the first output contact and the second output contact to determine the actual DC output voltage that is available to the load between the first and second output contacts; and
        feedback logic coupled to the voltage feedback circuit configured to compare the actual DC output voltage to the target DC bus voltage to determine an error value and, determine a duty cycle of the gated power switches based on the error value,
    wherein the target DC bus voltage is different from the AC voltage generated by the AC generator.

2. The system of claim 1, wherein the shunt controller comprises speed detection logic configured to determine zero crossings of the AC voltages and determine the rotational speed of the AC generator based on a time elapsed between the zero crossings.

3. The system of claim 1, wherein the gated power switches consist of metal-oxide semiconductor field-effect transistors (MOSFETs).

4. The system of claim 3, wherein the shunt regulator comprises a housing and a circuit board within the housing supporting the MOSFETs, and wherein the MOSFETs are not potted.

5. The system of claim 1, wherein the shunt regulator comprises a housing, a circuit board within the housing supporting the gated power switches, and a six contact interface including three contacts electrically coupled to the windings of the AC generator, the first output contact, the second output contact, and a local interconnect network (LIN) contact, and an air passage within the housing surrounding surfaces of the gated power switches.

6. The system of claim 5, wherein the shunt regulator further comprises a temperature sensor, a LIN transceiver coupled to the LIN contact, and communication logic operable, in a first operating mode, to signal an overheat condition by changing a logical state of the LIN contact, and to receive a transition command over the LIN contact and transition to a second operating mode responsive to the transition command, wherein in the second operating mode the LIN transceiver is operable to send and receive data over the LIN contact.

7. The system of claim 5, wherein the housing comprises two contact shrouds, one of the contact shrouds surrounding the three contacts electrically coupled to the windings of the AC generator and the other contact shroud surrounding the first output contact, the second output contact, and the LIN contact, wherein removal of the housing from the vehicle simultaneously disconnects the shunt regulator from the AC generator, the load, and the LIN.

8. The system of claim 1, wherein the windings are low voltage windings which generate AC voltages resulting in unboosted rectified DC voltage less than the actual DC output voltage at the first speed, wherein the AC generator comprises a flywheel and a magneto comprising magnet material, and wherein the system is capable of generating the same power at 800 flywheel revolutions per minute compared to a generator comprising windings which can generate AC voltages resulting in unboosted rectified DC voltage equal to the target DC bus voltage, with at least 13% less magnet material.

9. The system of claim 1, wherein the target DC bus voltage is a desired DC output voltage at the first and second output contacts.

10. The system of claim 1, wherein the minimum duty cycles are determined based on a mapping between the rotational speeds of the AC generator and the minimum duty cycles.

11. A shunt regulator for a vehicle, the shunt regulator comprising:
    a first output contact and a second output contact, the first output contact and the second output contact adapted to electrically connect a load to the shunt regulator;
    alternating-current (AC) generator contacts adapted to electrically connect an AC voltage generator to the shunt regulator, wherein the AC generator is operable to generate AC voltages including a nominal AC voltage at a first speed of the vehicle when operating at a peak power point;
    gated power switches electrically coupled between the AC generator contacts and the first output contact and between the AC generator contacts and the second output contact, each of the gated power switches comprising a gate operable to control current flow through the respective gated power switch;
    a shunt controller communicatively coupled to the gates of the gated power switches, the shunt controller configured to:
        operate the gated power switches at duty cycles selected to boost the AC voltages, including the nominal AC voltage, to generate a target DC output voltage in a first mode of operation; and
        when the duty cycles in the first mode of operation would be less than minimum duty cycles corresponding to rotational speeds of the AC generator, operate the gated power switches at the minimum duty cycles in a second mode of operation;

a voltage feedback circuit coupled to the first output contact and the second output contact to determine the actual DC output voltage that is available to the load between the first and second output contacts; and feedback logic coupled to the voltage feedback circuit configured to compare the actual DC output voltage to the target DC bus voltage to determine an error value and determine a duty cycle of the gated power switches based on the error value, wherein the target DC bus voltage is different from the AC voltage generated by the AC generator.

12. The shunt regulator of claim 11, wherein the shunt controller comprises speed detection logic configured to determine zero crossings of the AC voltages and determine the rotational speed of the AC generator based on a time elapsed between the zero crossings.

13. The shunt regulator of claim 11, wherein the gated power switches consist of metal-oxide semiconductor field-effect transistors (MOSFETs), wherein the shunt regulator comprises a housing and a circuit board within the housing supporting the gated power switches, and wherein the MOSFETs are not potted.

14. The shunt regulator of claim 11, wherein the shunt regulator comprises a housing, a circuit board within the housing supporting the gated power switches, and a six contact interface including three contacts electrically coupled to the windings of the AC generator, the first output contact, the second output contact, and a local interconnect network (LIN) contact, and an air passage within the housing surrounding surfaces of the gated power switches.

15. The shunt regulator of claim 14, wherein the shunt regulator further comprises a temperature sensor, a LIN transceiver coupled to the LIN contact, and communication logic operable, in a first operating mode, to signal an overheat condition by causing a logical state of the LIN contact, and to receive a transition command via the LIN contact and transition to a second operating mode responsive to the transition command, wherein in the second operating mode the communication logic causes the LIN transceiver to send and receive data over the LIN contact.

16. The shunt regulator of claim 14, wherein the housing comprises two contact shrouds, one of the contact shrouds surrounding the AC generator contacts and the other contact shroud surrounding the first output contact, the second output contact, and the LIN contact, wherein removal of the housing from the vehicle simultaneously disconnects the shunt regulator from the AC generator, the load, and the LIN.

17. The shunt regulator of claim 11, wherein the target DC bus voltage is a desired DC output voltage at the first and second output contacts.

18. A method of electrical power generation in a vehicle having a combustion engine, the method comprising:

receiving, by a shunt regulator including a shunt controller, alternating-current (AC) power from an AC generator mechanically coupled to the combustion engine, wherein the AC generator is operable to generate AC voltages including a nominal AC voltage at a first speed of the vehicle when operating at a peak power point;

by the shunt controller:
operating, in a first mode of operation, gated power switches at duty cycles selected to boost the nominal AC voltage to an actual DC output voltage corresponding to a target DC bus voltage, boosting, in the first mode of operation, the AC voltages to the target DC output voltage in response to changes in a load, and limiting, in a second mode of operation, the duty cycles to minimum duty cycles corresponding to rotational speeds of the AC generator when it is determined that the duty cycles of the first mode of operation would be less than the minimum duty cycles; and determining, by the shunt regulator, a duty cycle based on an error between the actual DC output voltage that is available to the load and the target DC bus voltage, wherein the target DC bus voltage is different from the AC voltage generated by the AC generator.

19. The method of claim 18, further comprising, by the shunt controller, determining zero crossings of the AC voltages and determining the rotational speed of the AC generator based on a time elapsed between the zero crossings.

20. The method of claim 18, further comprising, in a first operating mode, sensing a temperature inside a housing of the shunt regulator, and signaling an overheat condition based on the temperature by changing a logical state of a local interconnect network (LIN) contact of the shunt regulator.

21. The method of claim 20, further comprising receiving a transition command over the LIN contact, transitioning to a second operating mode responsive to the transition command, and, by a LIN transceiver in the second operating mode, sending or receiving data over the LIN contact.

22. The method of claim 18, wherein the target DC bus voltage is a desired DC output voltage at the first and second output contacts.

* * * * *